(12) United States Patent
Payne

(10) Patent No.: US 8,615,495 B1
(45) Date of Patent: Dec. 24, 2013

(54) TECHNIQUES FOR PROVIDING A DIFFERENTIAL BACKUP FROM A STORAGE IMAGE

(75) Inventor: Michael Payne, Archer, FL (US)

(73) Assignee: Symantec Corporation, Mountain View, CA (US)

(*) Notice: Subject to any disclaimer, the term of this patent is extended or adjusted under 35 U.S.C. 154(b) by 779 days.

(21) Appl. No.: 12/191,029

(22) Filed: Aug. 13, 2008

(51) Int. Cl.
*G06F 7/00* (2006.01)

(52) U.S. Cl.
USPC ........... 707/647; 707/646; 707/649; 707/681; 707/685

(58) Field of Classification Search
USPC ................. 707/646, 647, 649, 681, 685
See application file for complete search history.

(56) References Cited

U.S. PATENT DOCUMENTS

| | | | | |
|---|---|---|---|---|
| 5,369,616 A * | 11/1994 | Wells et al. | ............... | 365/185.22 |
| 5,522,037 A * | 5/1996 | Kitagawa et al. | ............... | 714/40 |
| 5,907,672 A * | 5/1999 | Matze et al. | ............... | 714/8 |
| 6,141,773 A * | 10/2000 | St. Pierre et al. | ............... | 714/20 |
| 6,385,706 B1 * | 5/2002 | Ofek et al. | ............... | 711/162 |
| 6,397,308 B1 * | 5/2002 | Ofek et al. | ............... | 711/162 |
| 6,487,561 B1 * | 11/2002 | Ofek et al. | ............... | 1/1 |
| 6,651,077 B1 * | 11/2003 | East et al. | ............... | 1/1 |
| 6,920,537 B2 * | 7/2005 | Ofek et al. | ............... | 711/163 |
| 7,100,089 B1 * | 8/2006 | Phelps | ............... | 714/42 |
| 7,107,395 B1 * | 9/2006 | Ofek et al. | ............... | 711/112 |
| 7,251,749 B1 * | 7/2007 | Fong et al. | ............... | 714/20 |
| 7,743,031 B1 * | 6/2010 | Cameron et al. | ............... | 707/649 |
| 8,060,476 B1 * | 11/2011 | Afonso et al. | ............... | 707/649 |
| 2003/0005083 A1 * | 1/2003 | Owhadi et al. | ............... | 709/218 |
| 2003/0061456 A1 * | 3/2003 | Ofek et al. | ............... | 711/162 |
| 2005/0204108 A1 * | 9/2005 | Ofek et al. | ............... | 711/162 |
| 2005/0216788 A1 * | 9/2005 | Mani-Meitav et al. | ............... | 714/6 |
| 2006/0242211 A1 * | 10/2006 | Becker et al. | ............... | 707/204 |
| 2009/0240904 A1 * | 9/2009 | Austruy et al. | ............... | 711/162 |

* cited by examiner

*Primary Examiner* — Cheyne D Ly
(74) *Attorney, Agent, or Firm* — Wilmer Cutler Pickering Hale and Dorr LLP

(57) ABSTRACT

Techniques for providing a differential backup from a storage image are disclosed. In one particular exemplary embodiment, the techniques may be realized as a method for providing a differential backup from a storage image comprising identifying one or more dirty blocks in a storage image, creating a differential backup data structure, and transmitting the one or more dirty blocks to a data management process utilizing the differential backup data structure to provide a differential backup.

20 Claims, 3 Drawing Sheets

TECHNIQUES FOR PROVIDING A DIFFERENTIAL BACKUP FROM A STORAGE IMAGE

FIELD OF THE DISCLOSURE

The present disclosure relates generally to creating an application backup and, more particularly, to techniques for providing a differential backup from a storage image.

BACKGROUND OF THE DISCLOSURE

Backups may be created utilizing several different methods. The different methods each may have their advantages, but utilizing different backup methods for a common backup client may not be compatible. For example, backups may be created at a file system block level. Backups may also be created at an application level, which may ensure that the application has the data to ensure that the application is in a consistent state. Backups may be full backups, meaning that they cover an entire set of data required to restore a system. Backups may also be partial or differential backups which may store only data since a previous backup. Application level backups and block level backups may be either full or differential backups. Maintaining a chronological order to backups may be important to ensure data integrity when restoring a system using the backups.

Different types of backups may have incompatibilities with each other. For example, block level backups may have incompatibilities with application level backups. Specifically, restoring a differential block based backup may prevent subsequent utilization of an application level backup. For example, if a user has block level backups and database level backups, the restoration of a differential block level backup may prevent the restoration of a database level backup. For example, if a user has a full block level backup from a Sunday night, a block level backup from Monday, and a database level differential backup from Tuesday, the user may be prevented from utilizing the database backup from Tuesday if the user relies on the block level backups.

Also, a block level backup may restore a system to a state in which a database is not capable of applying application level backups created after the block level backup was created. For example, if critical data is accidentally deleted from the database on Tuesday afternoon, a user may want to use a database level differential backup from Tuesday to restore transactions up to a point in time prior to the accidental deletion of the data.

Other applications may have similar conditions which require application level backups. However, block level backups may provide advantages over application level backups, such as with the backup of data associated with multiple applications, speed, and other advantages. For example, a storage image (e.g., a block level backup), such as a snapshot, may be created when a database or another application is running. This may provide a block level full backup without disruption to a user.

Additionally, many block level full backups may be sent to storage remote from a backup client. This may be done for safety, storage concerns, or other reasons. Sending a full backup from a remote location to a client for restoration may not be desirable if an application level differential backup would enable restoration of the client.

In view of the foregoing, it may be understood that there are significant problems and shortcomings associated with current data backup technologies.

SUMMARY OF THE DISCLOSURE

Techniques for providing a differential backup from a storage image are disclosed. In one particular exemplary embodiment, the techniques may be realized as a method for providing a differential backup from a storage image comprising identifying one or more dirty blocks in the storage image, creating a differential backup data structure, and transmitting the one or more dirty blocks to a data management process utilizing the differential backup data structure to provide a differential backup.

In another particular exemplary embodiment, the techniques may be realized as an article of manufacture for providing a differential backup from a storage image, wherein the article of manufacture comprises at least one processor readable medium and instructions carried on the at least one medium, wherein the instructions are configured to be readable from the at least one medium by at least one processor and thereby cause the at least one processor to operate so as to identify one or more dirty blocks in a storage image, create a differential backup data structure, and transmit the one or more dirty blocks to a data management process utilizing the differential backup data structure to provide a differential backup.

In yet another particular exemplary embodiment, the techniques may be realized as a system providing a differential backup from a storage image comprising one or more processors communicatively coupled to a network, wherein the one or more processors are configured to identify one or more dirty blocks in a storage image, create a differential backup data structure, and transmit the one or more dirty blocks to a data management process utilizing the differential backup data structure to provide a differential backup.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
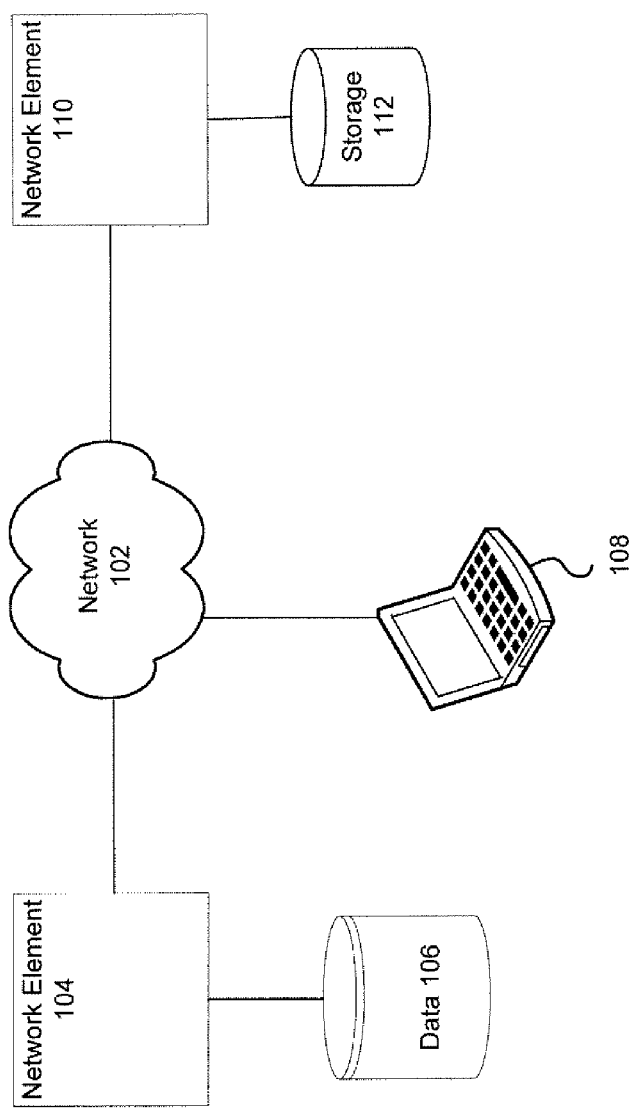
FIG. 1 shows a system for providing a differential application level backup in accordance with an embodiment of the present disclosure.

Referring to FIG. 1, there is shown a system 100 for providing a differential application level backup in accordance with an embodiment of the present disclosure. FIG. 1 is a simplified view of system 100, which may include additional elements that are not depicted. Network elements 104 and 110 may be communicatively coupled to network 102. Computer 108 may be communicatively coupled to network 102. Data 106 may be communicatively coupled to network element 104. Storage 112 may be communicatively coupled to network element 110.

Network 102 may be a local area network (LAN), a wide area network (WAN), the Internet, a cellular network, a satellite network, or another network that permits communication between network elements 104 and 110, computer 108 and other devices communicatively coupled to network 102.

Network elements 104 and 110 may be application servers, backup servers, network storage devices, media servers, or other devices communicatively coupled to network 102. Network elements 104 and 110 may utilize storage 112 for the storage of application data, backup data, or other data.

Network elements 104 and 110 may be hosts, such as an application server, which may process data traveling between itself and a backup device, a backup process, and/or storage.

Network element 110 may be a backup server attached to storage 112. In one or more embodiments, network element 110 may be capable of processing data received from or transmitted to storage 112. In other embodiments, network element 110 may represent a network appliance connected to a storage area network.

Computer 108 may be a desktop computer, a laptop computer, a server, or other computer capable of performing private network backbone analysis. Computer 108 may receive data from user input, a database, a file, a web service, and/or an application programming interface. Computer 108 may query other systems and/or local or remote storage, such as data 110, network elements 104 and 110, and storage 112, to obtain backup information. Computer 108 may provide an interface to an administrator or other user of a backup management process. In one or more embodiments, computer 108 may enable a user to request a differential backup. Computer 108 may enable a user to view, edit, search, and/or select data that may contain dirty blocks to be utilized for a differential backup. For example, computer 108 may enable a user to query a database, a file system or other resources to locate data which may be utilized for a differential backup. A user may specify files to be contained in a storage image from which a differential backup may be generated. In some embodiments, a process, such as a backup management process, may locate the files automatically by querying a database or other resource, and may automatically generate the differential backup.

Data 106 may be network accessible storage and may be local, remote, or a combination thereof to network elements 104, and 110. Data 106 may utilize a tape, disk, a storage area network (SAN), or other computer accessible storage. In one or more embodiments, data 106 may represent a database or another application instance.

In one or more embodiments, data from storage 112 may be images, such as snapshots or other file system block level backups. Network element 110 may be a backup server which may handle requests for backup data. For example, network element 104 may be an application server or a database server seeking to restore an application instance or a database instance. Network element 104 may have access to a locally stored full block level backup which may not be recent enough to restore data to a desired status. For example, network element 104 may have a full block level backup from a Sunday night stored on data 106 which may restore a database running on data 106 to a status current as of Sunday night.

Network element 104 may also be configured to have periodic block level backups created and transferred to remote storage, such as storage 112. For example, periodic snapshots of data 106 may be created using Microsoft's Volume Snapshot Service, or another service, and may be transferred to storage 112. On the following Tuesday afternoon a problem may be detected such as a transaction on that Tuesday morning which deleted critical database entries. Restoring to the Sunday backup and resuming service from that point would result in the loss of all data changes from Monday's transactions. This may mean a significant amount of lost sales data or other critical data. A block level full backup from Monday night, such as a snapshot, may exist on storage 112. Thus, transferring a full backup from storage 112 to network element 104 for restoration on data 106 may take a significant amount of time and/or network bandwidth. Transferring a differential application level backup may be preferable.

Network element 110 may utilize a block level backup to generate an application level backup. Network element 110 may create an application level differential backup from a block level backup, such as the snapshot created on Monday night. The block level backup may be a snapshot stored in storage 112 and may contain data needed to restore transactions which occurred on Monday. Network element 110 may create a data structure for the application level backup. For example, network element 110 may create a file structure corresponding to an application backup file, such as a database backup file header, an application backup file header, an export file header, a Microsoft Tape Format (MTF) file header, a log file header, or other backup, export, or archive data formats. Network element 110 may identify one or more blocks which are "dirty" blocks corresponding to transactions which have not been committed to a database, or application events which have not been fully reconciled or committed. Network element 110 may query a database, an application, or search a file structure of a backup target in order to identify files or other information necessary to create an application level backup. In one or more embodiments, network element 110 may format the identified "dirty" blocks into a backup format. Network element 110 may then stream or write the backup file structure and the identified "dirty" blocks in a format compatible with a database or an application. In some embodiments, an application backup file may be created in memory from a created application backup file structure and the identified "dirty blocks" and may be streamed to a receiving process such as a recovery process running on a database. In some embodiments, network element 110 may write the application backup file structure and identified "dirty" blocks to a file to create a differential application level backup file. The created differential application level backup file may then be used by one or more recovery processes.

A differential application level backup may require less bandwidth to transfer than a full backup. A differential application level backup may also enable a recovering process to "roll forward" transactions to particular point in time. This may enable the recovering process to apply transactions chronologically until a point in time prior to an incident causing data loss or corruption. For example, network element 110 may stream an application level differential backup file, such as a MTF file or one or more log files, to a database recovery process running on network element 104. This may enable network element 104 to apply Monday's transactions to the database stored on data 106.

Additionally, if an application level backup is utilized for restoration or recovery, subsequent application level backups may be utilized. In some embodiments, an application level backup may maintain transaction integrity (e.g., prevent the loss of transactions not yet committed to a database, data contained in files not closed, or other data in a transitional state). For example, in addition to the full backup from Sunday night and the generated application level differential backup from Monday night as described above, network element 104 may have access to an application level differential backup from Tuesday night. Network element 104 may utilize the application level differential backup from Tuesday night to apply transactions that occurred on Tuesday morning prior to a deletion or other events that may have caused a loss or corruption of data. This may effectively recover a database to a point in time prior to the data loss and/or corruption. While utilization of a block level backup, such as the block level backup from Monday night, may not be compatible with a later created application level backup, utilization of a generated application level backup may be compatible (e.g., may maintain transaction integrity).

Figure 2:
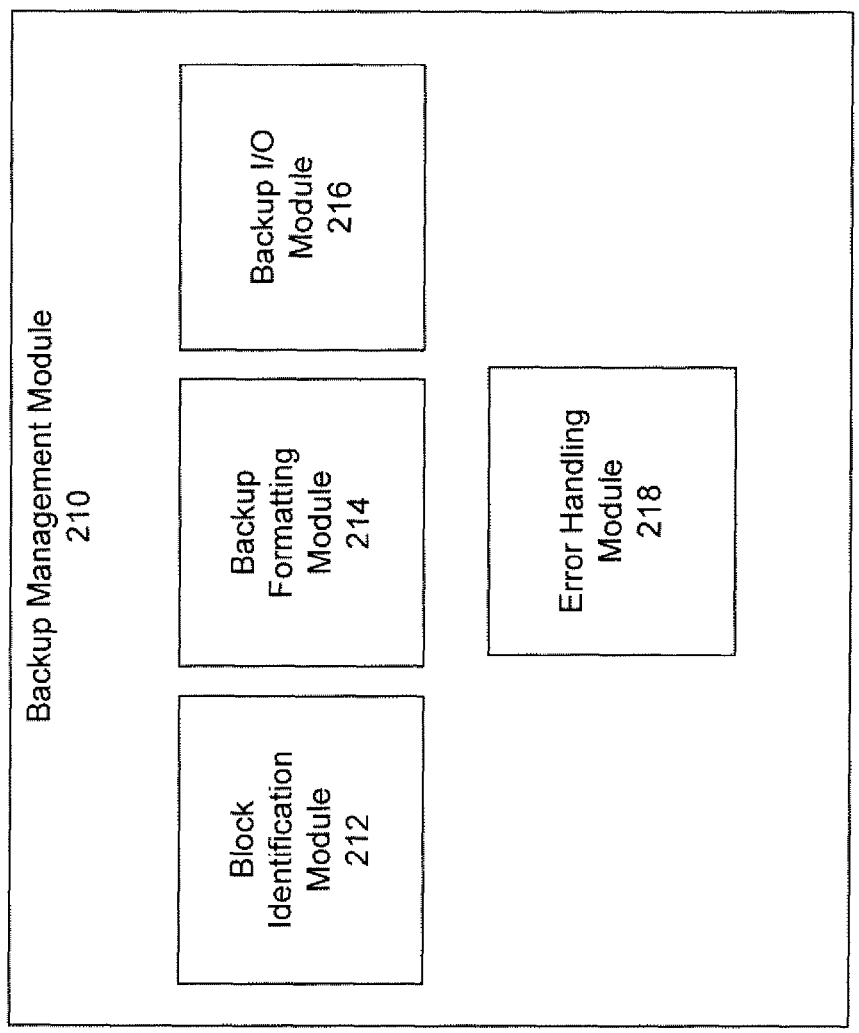
FIG. 2 shows a module for providing an application level backup in accordance with an embodiment of the present disclosure.

Referring to FIG. 2, there is shown a backup management module 210 for providing a differential application level backup in accordance with an embodiment of the present disclosure. As illustrated, the backup management module 210 may contain one or more components including block identification module 212, backup formatting module 214, backup I/O module 216, and error handling module 218.

Block identification module 212 may identify one or more blocks necessary to restore a database, an application, or another system. Block identification module 212 may query a backup target, such as a database or another application, in order to identify files or other data structures necessary to produce an application level differential backup. Block identification module 212 may search file structures of backup targets. In one or more embodiments, block identification module 212 may utilize log files and/or dirty block bit map files. In some embodiments, block identification module 212 may identify files and obtain a block level backup containing these files. For example, block identification module 212 may obtain a snapshot of a volume, files, or other storage configuration containing identified "dirty" blocks.

Backup formatting module 214 may determine and create a data structure which may be utilized for an application level differential backup. Backup formatting module 214 may create a file header or other data structure to accommodate "dirty" blocks identified by block identification module 212. Backup formatting module 214 may format "dirty" blocks into an application backup format.

Backup I/O module 216 may retrieve, receive, and/or transmit "dirty" blocks, backup files, and/or other backup data structures. Backup I/O module 216 may stream a dynamically created backup file structure to a recovery or restoration process. Backup I/O module 216 may also write backup data structures, such as differential application level backups, to storage. In one or more embodiments, backup I/O module 216 may compress, encrypt, or otherwise prepare backup data structures for transmission or storage.

Error handling module 218 may handle errors associated with differential application level backup generation. Error handling module 218 may log application level backup errors, such as errors occurring during identification of "dirty" blocks, during creation of backup data structures, during transmission of backup data structures, and other backup creation error related events.

Figure 3:
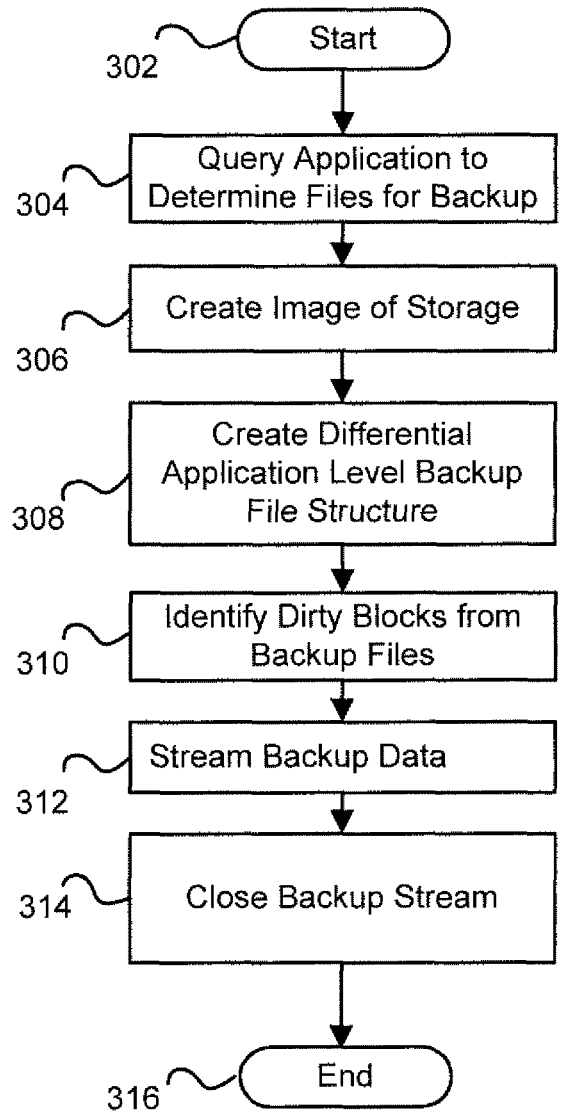
FIG. 3 depicts a method for providing an application level backup in accordance with an embodiment of the present disclosure.

Referring to FIG. 3, there is depicted a method 300 for providing a differential application level backup in accordance with an embodiment of the present disclosure. At block 302, the method 300 for providing a differential application level backup may begin.

At block 304, the method 300 may query an application instance, such as a database, to determine which files or other data structures may be utilized for creation of a differential application level backup.

At block 306, the method 300 may create an image of storage containing one or more files or data structures that have been identified at block 304. In some embodiments, the image of storage may be a snapshot containing identified files for backup.

At block 308, the method 300 may create a differential application file structure. For example, a tape file header or other file header may be created. The differential application file structure may conform to the requirements of a recovery or restoration process for an application or database instance to be recovered and/or restored. In some embodiments, control files, log files, or other data structures may be created.

At block 310, the method 300 may identify one or more "dirty" blocks in the image of storage. Log files, bitmap files, and other data structures contained in the image of storage may be utilized to identify blocks containing uncommitted transactions or other application events marked as "dirty".

At block 312, the method 300 may stream application level differential backup data. In some embodiments, the data may be streamed to a file. In one or more embodiments, the data may be streamed to a backup or recovery process. In some embodiments, the data may be formatted to comply with a backup data format expected by a recovery and/or a restoration process which may utilize the data.

At block 314, the method 300 may close the backup stream. This may closing a file handle, ending a stream of data to a receiving process or performing other actions to conclude the creation of a backup file.

At block 316, the method 300 may end.

At this point it should be noted that providing a differential backup in accordance with the present disclosure as described above typically involves the processing of input data and the generation of output data to some extent. This input data processing and output data generation may be implemented in hardware or software. For example, specific electronic components may be employed in a module for backup management or similar or related circuitry for implementing the functions associated with providing a differential backup in accordance with the present disclosure as described above. Alternatively, one or more processors operating in accordance with instructions may implement the functions associated with providing a differential backup in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for providing a differential application backup from a block level storage image, the method comprising:
   identifying one or more dirty blocks in the block level storage image, wherein identifying one or more dirty blocks comprises identifying dirty blocks stored at an operating system file system level, wherein the stored dirty blocks represent changes to application data;
   determining a backup file format for the one or more dirty blocks compatible with a differential application backup data structure, wherein the backup file format allows for restoration based at least in part on the differential application backup and not on the block level storage image;
   creating the differential application backup data structure, wherein the creating the differential application backup data structure comprises formatting the one or more dirty blocks to have the backup file format, and wherein the application backup data structure includes an application-specific backup file header and the formatted one or more dirty blocks; and
   transmitting the one or more dirty blocks to a data management process utilizing the differential application backup data structure to provide the differential application backup.

2. The method of claim 1, further comprising:
   identifying one or more files of an application for backup; and
   creating the storage image containing the one or more files.

3. The method of claim 1, wherein the storage image is a snapshot.

4. The method of claim 2, wherein the application is a database.

5. The method of claim 4, wherein the differential backup maintains transactional integrity.

6. The method of claim 5, further comprising:
   utilizing the differential backup to restore a database; and
   utilizing a subsequent database transactional backup to enable restoration of transactional data subsequent to restoration of the database.

7. The method of claim 1, wherein the application-specific backup file header includes at least one of a database backup file header, an export file header, a Microsoft Tape Format (MTF) backup file header, and a log file header.

8. The method of claim 1, wherein transmitting the one or more dirty blocks to a data management process comprises streaming the one or more dirty blocks in the backup file format to a data management process, wherein the data management process comprises a database restoration process.

9. The method of claim 1, wherein transmitting the one or more dirty blocks to a data management process comprises streaming the one or more dirty blocks in the backup file format to a data management process, wherein the data management process comprises a differential backup file writing process.

10. At least one non-transitory processor readable medium for storing a computer program of instructions configured to be readable by at least one processor for instructing the at least one processor to execute a computer process for performing the method as recited in claim 1.

11. An article of manufacture for providing a differential application backup from a block level storage image, the article of manufacture comprising:
    at least one non-transitory processor readable medium; and
    instructions carried on the at least one medium;
    wherein the instructions are configured to be readable from the at least one medium by at least one processor and thereby cause the at least one processor to operate so as to:
    identify one or more dirty blocks in the block level storage image, wherein identifying one or more dirty blocks comprises identifying dirty blocks stored at an operating system file system level, wherein the stored dirty blocks represent changes to application data;
    determine a backup file format for the one or more dirty blocks compatible with a differential application backup data structure, wherein the backup file format allows for restoration based at least in part on the differential application backup and not on the block level storage image;
    create the differential application backup data structure, wherein the creating the differential application backup data structure comprises formatting the one or more dirty blocks to have the backup file format, and wherein the application backup data structure includes an application-specific backup file header and the formatted one or more dirty blocks; and
    transmit the one or more dirty blocks to a data management process utilizing the differential application backup data structure to provide the differential application backup.

12. A system providing a differential application backup from a block level storage image, the system comprising:
    one or more processors communicatively coupled to a network; wherein the one or more processors are configured to:
    identify one or more dirty blocks in the block level storage image, wherein identifying one or more dirty blocks comprises identifying dirty blocks stored at an operating system file system level, wherein the stored dirty blocks represent changes to application data;
    determine a backup file format for the one or more dirty blocks compatible with a differential application backup data structure, wherein the backup file format allows for restoration based at least in part on the differential application backup and not on the block level storage image;
    create the differential application backup data structure, wherein the creating the differential application backup data structure comprises formatting the one or more dirty blocks to have the backup file format, and wherein the application backup data structure includes an application-specific backup file header and the formatted one or more dirty blocks; and
    transmit the one or more dirty blocks to a data management process utilizing the differential application backup data structure to provide the differential application backup.

13. The system of claim 12, wherein the one or more processors are further configured to:
    identify one or more files of an application for backup; and
    create the storage image containing the one or more files.

14. The system of claim 12, wherein the storage image is a snapshot.

15. The system of claim 13, wherein the application is a database.

16. The system of claim 12, wherein the differential backup maintains transactional integrity.

17. The system of claim 12, wherein the one or more processors are further configured to:
    utilize the differential backup to restore a database; and
    utilize a subsequent database transactional backup to enable restoration of transactional data subsequent to restoration of the database.

18. The system of claim 12, wherein the application-specific backup file header includes at least one of a database backup file header, an export file header, a Microsoft Tape Format (MTF) backup file header, and a log file header.

19. The system of claim 12, wherein transmitting the one or more dirty blocks to a data management process comprises streaming the one or more dirty blocks in the backup file format to a data management process, wherein the data management process comprises a database restoration process.

20. The system of claim 12, wherein transmitting the one or more dirty blocks to a data management process comprises streaming the one or more dirty blocks in the backup file format to a data management process, wherein the data management process comprises a differential backup file writing process.

* * * * *